United States Patent [19]

Hamazaki et al.

[11] Patent Number: 5,158,914
[45] Date of Patent: Oct. 27, 1992

[54] METHOD OF HEAT-TREATING SILICON NITRIDE SINTERED BODY

[75] Inventors: Kagehisa Hamazaki, Asaka; Kazumi Miyake, Higashikurume; Yasunobu Kawakami, Fujimi, all of Japan

[73] Assignee: Honda Giken Kogyo Kabushiki Kaisha, Tokyo, Japan

[21] Appl. No.: 758,105

[22] Filed: Sep. 12, 1991

[30] Foreign Application Priority Data

Sep. 14, 1990 [JP] Japan .................................. 2-244484

[51] Int. Cl.$^5$ .................................. C04B 35/58
[52] U.S. Cl. .................................. 501/97; 501/98; 264/65; 264/66; 423/344
[58] Field of Search .................. 501/97, 98; 264/65, 264/66; 423/344

[56] References Cited

U.S. PATENT DOCUMENTS

| | | | |
|---|---|---|---|
| 4,072,532 | 2/1978 | Fletcher et al. ............... | 501/98 |
| 4,466,820 | 8/1984 | Clarke ............................ | 204/130 |
| 4,506,021 | 3/1985 | Jack et al. ..................... | 501/98 |
| 4,830,800 | 5/1989 | Thomas et al. ................ | 501/97 |
| 4,892,848 | 1/1990 | Yoshida et al. ............... | 264/66 |
| 4,977,112 | 12/1990 | Matsui ............................ | 264/65 |

FOREIGN PATENT DOCUMENTS

| | | |
|---|---|---|
| 0234905 | 9/1987 | European Pat. Off. . |
| 49-21019 | 5/1974 | Japan . |
| 0151371 | 9/1983 | Japan ....................... 501/98 |
| 63-185863 | 8/1988 | Japan . |

OTHER PUBLICATIONS

Journal of the American Ceramic Society, vol. 73, No. 5, May 1990, pp. 1443-1445.
Journal of Materials Science, vol. 26, No. 4, Feb. 1991, pp. 970-976.
Derwent Publications Abstract for JP 57140381.

Primary Examiner—Karl Group
Assistant Examiner—Paul Marcantoni
Attorney, Agent, or Firm—Birch, Stewart, Kolasch & Birch

[57] ABSTRACT

In the method of heat-treating a silicon nitride sintered body which was produced from silicon nitride powder and sintering aid powder in order to provide it with an increased crystallinity, the silicon nitride sintered body is heat-treated in a non-oxidizing atmosphere under conditions such that the silicon nitride sintered body is embedded in at least one selected from the group consisting of powders of W, Mo, Ta, Re and carbides thereof.

14 Claims, 1 Drawing Sheet

METHOD OF HEAT-TREATING SILICON NITRIDE SINTERED BODY

BACKGROUND OF THE INVENTION

1. Field of the Invention

The present invention relates to a method of heat-treating a silicon nitride sintered body in order to improve its crystallinity and thereby improving its high-temperature strength. More particularly the present invention relates to a method of heat-treating a silicon nitride sintered body by which the desired high-temperature strength can be achieved in a short period of time through improving its crystallinity.

2. Description of the Related Art

Silicon nitride sintered bodies are expected to be used as structural ceramics for gas turbine parts or other embodiments that require operability under severe conditions at high temperatures, etc. because of their unique properties such as high strength, heat resistance, thermal shock resistance, wear resistance, oxidation resistance, etc. However, since the silicon nitride itself is a material which cannot be easily sintered, various sintering aids are added.

These sintering aids function to form a glassy boundary phase in the boundaries of silicon nitride grains, thereby accelerating the sintering of silicon nitride. In the course of sintering, it is presumed that a small amount of $SiO_2$ present in the surface of silicon nitride particles contributes to the formation of the glass phase in the boundaries of silicon nitride grains. By using these sintering aids, a sintering reaction easily proceeds. However, a glass phase of a low melting point forms in the boundaries of silicon nitride grains in the resulting sintered bodies, thereby deteriorating the high-temperature strength of the sintered body.

Accordingly, the following attempts were proposed to prevent a decrease in the strength of the silicon nitride sintered bodies at a high temperature. For example, there are methods of selecting particular types and amounts of sintering aids, thereby achieving the accelerated crystallization of boundary phases in silicon nitride grains: a method of adding oxides; of rare earth elements such as yttrium oxide, a method of adding both yttrium oxide and other oxides such as aluminum oxide (for instance, Japanese Patent Publication No. 49-21091); and a method of adjusting the formulation of yttrium oxide, aluminum oxide and silicon nitride to improve oxidation resistance at 1400° C. (Japanese Patent Laid-Open No. 63-185863).

However, the resulting silicon nitride sintered bodies obtained by these methods show insufficient high-temperature strength, and thus fail to meet the requirements for gas turbine parts, etc.

In addition, there is another method for improving the high-temperature strength of the silicon nitride sintered bodies, according to this method the silicon nitride sintered bodies are embedded an aluminum nitride powder and heated, thereby decomposing the oxides ($SiO_2$) present in the glass boundary phase of the sintered body. The thus formed to SiO which is vaporized, which results in a decrease in the oxygen content (the content of $SiO_2$) in the glass boundary phase.

However, according to this method of lowering the content of $SiO_2$, the heat treatment should be conducted for a long period of time, e.g., about 100 hours, in order to effectively increase the strength of the sintered bodies.

OBJECT AND SUMMARY OF THE INVENTION

Therefore, an object of the present invention provide a method of heat-treating a silicon nitride sintered body in order to provide it with increased crystallinity and thus high strength at a high temperature, in a short period of time.

As a result of intense research in view of the above object, the inventors have found that by heating a silicon nitride sintered body under conditions such that it is embedded in the specified metal powder and/or metal carbide powder, the high-temperature strength of the silicon nitride sintered body can be improved in a short period of time. The present invention is based upon this finding.

Thus, the method of heat-treating the silicon nitride sintered body for providing it with an increased crystallinity according to the present invention comprises heat-treating a silicon nitride sintered body produced from silicon nitride powder and sintering aid powder, in a non-oxidizing atmosphere under conditions such that said silicon nitride sintered body is embedded in at least one selected from the group consisting of powders of W, Mo, Ta, Re and carbides thereof.

DETAILED DESCRIPTION OF THE INVENTION

Figure 1:
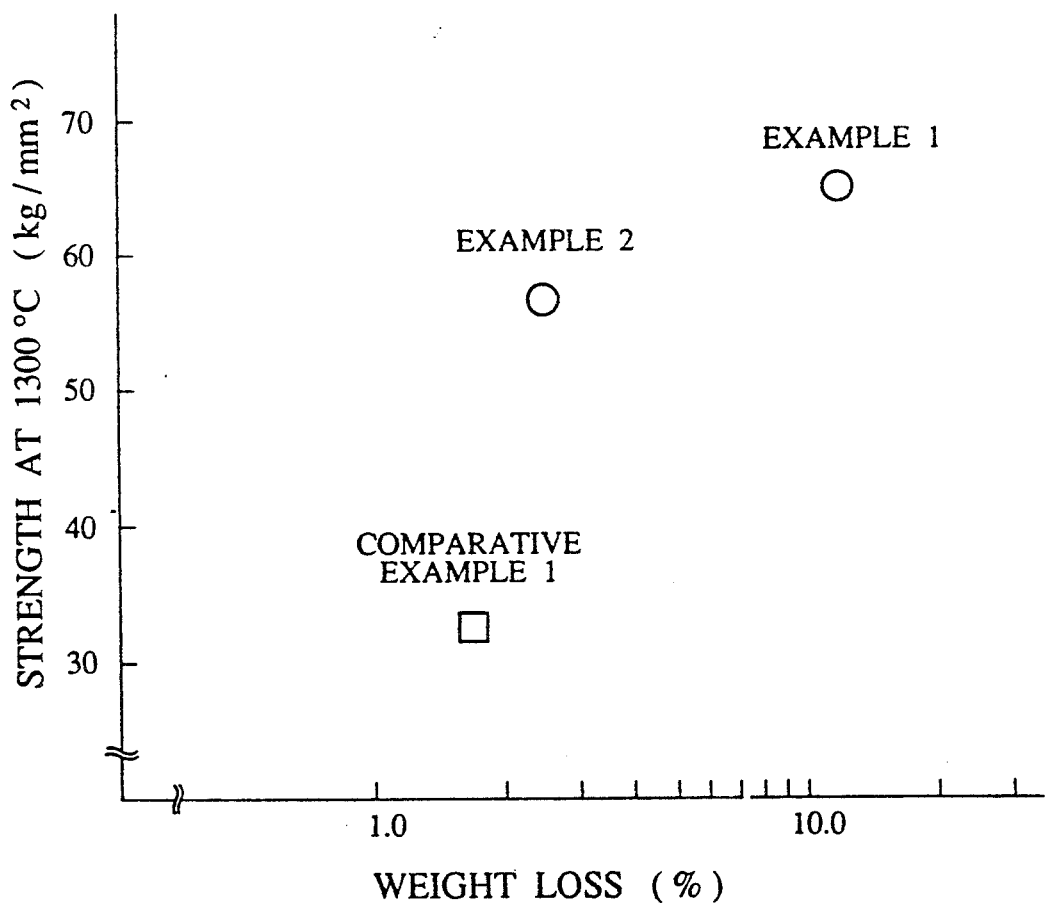
FIG. 1 is a graph showing the relationship between a weight loss after the heat treatment and a strength at a high temperature (1300° C.) with respect to samples of silicon nitride sintered bodies in Examples 1, 2 and Comparative Example 1.

First the silicon nitride sintered body will be explained.

In the present invention, the silicon nitride sintered body consists of silicon nitride as a main component and one or more sintering aids.

As the sintering aids, compounds of elements in Group IIIa in the Periodic Table (hereinafter referred to simply as "IIIa elements") or a mixture of Al compounds and the compounds of the IIIa elements may be used. The IIIa elements usable in the present invention are scandium, yttrium and lanthanide elements. A and the IIIa elements may be used in the form of oxides, organic acid salts, etc. Al compounds are preferably $Al_2O_3$, $Al_2TiO_5$, etc. The compounds of the IIIa elements are preferably $Y_2O_3$, yttrium oxalate, $Nd_2O_3$, $Yb_2O_3$, etc Solid solutions such as $3Y_2O_3 \cdot 5Al_2O_3$, may also be used.

When both $Al_2O_3$, and $Y_2O_3$ are used as a sintering aid, the silicon nitride sintered body preferably comprises 0.5–2 weight % of $Al_2O_3$, 2.5–5 weight % of $Y_2O_3$ and balance substantially silicon nitride. When the content of $Al_2O_3$, is higher than 2 weight %, the resulting sintered body has a poor oxidation resistance and a low strength at a high temperature. On the other hand, when the content of $Al_2O_3$, is lower than 0.5 weight %, the resulting sintered body cannot be made fully dense, failing to achieve high oxidation resistance and strength. When the content of $Y_2O_3$ is higher than 5 weight %, the resulting sintered body has a poor oxidation resistance at a high temperature. On the other hand, the content of $Y_2O_3$ is lower than 2.5 weight %, the resulting sintered body is not fully dense as in the case of $Al_2O_3$, failing to achieve the desired oxidation resistance and strength.

With respect to the silicon nitride powder which is a main starting material of the silicon nitride sintered body, the specific surface area is desirably 8-12 $m^2/g$. The content of metal impurities in the silicon nitride powder is desirably 200 ppm or less. Incidentally, since the sintered body is subjected to a heat treatment to remove $SiO_2$ from the sintered body, the silicon nitride powder is not strictly required to have a small oxygen content. However, if the oxygen content is too high, the time required for the heat treatment to remove $SiO_2$ becomes longer. Therefore, the oxygen content is preferably 3.0 weight % or less.

It is preferable that the silicon nitride powder has an average particle size of about 0.3-0.4 $\mu$m, that the $Al_2O_3$ powder has an average particle size of about 0.4-0.5 $\mu$m, and that the $Y_2O_3$ powder has an average particle size of about 0.4-2 $\mu$m.

The silicon nitride sintered body can be produced in the following manner:

First, silicon nitride powder and sintering aids such as $Al_2O_3$ powder and $Y_2O_3$ powder are mixed. The mixing may be conducted by a known method, e.g. by using a ball mill, a dispersing machine, etc. In the case of mixing by using a ball mill, it is preferred that ethanol etc. is added to a powder mixture. Balls to be used in the ball mill are preferably made of silicon nitride so that the contamination of the powder mixture with impurities can be avoided in the process of ball milling.

The resulting powder mixture is compressed to form a green body or a pressed body having the desired shape by a die press, a cold isostatic press (CIP), etc. In the process of pressing, pressing aids such as a polyvinyl alcohol solution, etc. may be added, if necessary.

The sintering of the green body is conducted in a non-oxidizing atmosphere, for instance, in a nitrogen gas atmosphere. The sintering may be conducted either pressurelessly (at normal pressure) or at a pressure of about 10 atm.

It is preferred that the sintering temperature is about 1750°-1950° C., and that the sintering time is about 2-4 hours.

When a green body is sintered pressurelessly, the resulting sintered body may be subjected to a hot isostatic pressing (HIP). It is preferred that the HIP is conducted at about 1700°-2000° C. and at a pressure of about 200-2000 atm for about 1-4 hours. By the HIP treatment, the sintered body can be made fully dense, resulting in a higher temperature strength.

The silicon nitride sintered body produced in the above method, etc., is then subjected to a heat treatment to achieve the crystallization of the boundary phase in silicon nitride grains, thereby improving strength at a high temperature. This heat treatment may be called simply as "crystallization heat treatment".

First, the sintered body is embedded in powder of at least one substance selected from W, Mo, Ta, Re and carbides thereof, and heat-treated in a non-oxidizing atmosphere.

Among the above powder, tungsten powder and tungsten carbide powder are particularly preferable. A mixture of tungsten powder and tungsten carbide powder may be used. The above metal powder and metal carbide powder have preferably an average particle size of about 1-10 $\mu$m.

The heat treatment temperature of the silicon nitride sintered body in the metal powder and/or the metal carbide powder is generally 1400°-1950° C., preferably 1700°-1800° C. although it depends upon the type of the powder used to some extent. When the heat treatment temperature is lower than 1400° C., the crystallization of the grain boundary phase does not proceed, failing to improve the high-temperature strength. On the other hand, when the heat treatment temperature exceeds 1950° C., silicon nitride undesirably starts to be decomposed. The time for heat treatment is generally 2-10 hours, preferably 2-5 hours although it depends upon the heat treatment temperature.

The heat treatment is conducted in a non-oxidizing atmosphere, preferably in a nitrogen gas, pressurelessly or at a pressure of up to about 10 atm. By using a nitrogen gas, the oxidation of silicon nitride can be prevented, and the heat decomposition of silicon nitride can also be prevented at a high temperature.

In the present invention, the silicon nitride sintered body is heat-treated while being embedded in at least one selected from powders of W, Mo, Ta, Re and carbides thereof. By the heat treatment, the crystallization of the glassy boundary phase between silicon nitride grains is achieved, thereby raising a melting point of the sintered body, resulting in a high strength of the sintered body.

It is not necessarily clear why the effects of the present invention can be obtained, but it may be presumed as follows:

When the silicon nitride sintered body is heated while being embedded in tungsten powder, tungsten carbide powder, etc., the oxygen of $SiO_2$ present in a grain boundary phase in the silicon nitride sintered body functions to oxidize tungsten, a tungsten carbide, etc. Tungsten is oxidized to tungsten oxide, and a tungsten carbide is also oxidized to tungsten oxide, carbon monoxide, etc. On the other hand, $SiO_2$ loses its oxygen and changes mainly to SiO.

Tungsten oxide is vaporized at a temperature of about 1200° C. or higher. Since SiO exists in a gas phase at such a high temperature, SiO is also vaporized. Thus, the tungsten oxide, SiO, carbon monoxide, etc. are altogether removed as gas components so that the oxidation of tungsten, tungsten carbide, etc. further proceeds by the existence of $SiO_2$.

The oxygen in the boundary phase in silicon nitride grains is consumed by tungsten, tungsten carbide, etc., resulting in a decrease in the content of $SiO_2$ in the boundary phase. Such a decrease in the content of $SiO_2$ in the boundary phase accelerates the crystallization of the glassy boundary phase, leading to a high melting point of the boundary phase.

For the above reasons, by the heat treatment of the present invention, the strength of the grain boundary phase in the silicon nitride sintered body at a high temperature is improved, resulting in the improvement of the high-temperature strength of the silicon nitride sintered body itself.

The present invention will be described referring to the following Examples without intention of restriction.

EXAMPLES 1-5, COMPARATIVE EXAMPLES 1-5

96.5 weight of silicon nitride powder (TS-10Y, manufactured by Tosoh Corporation, Oxygen Content=1.0 weight %), 1.0 weight % of $Al_2O_3$ powder (AKP 30, manufactured by Sumitomo Chemical, Co., Ltd.) and 2.5 weight % of $Y_2O_3$ powder (fine powder, manufactured by Nippon Yttrium Co., Ltd.) were mixed.

To 500 g of the resulting powder mixture, 500 g of ethanol was added, and the resulting mixture was subjected to ball milling by using 400 g of balls made of silicon nitride.

The resulting mixture was dried by using a rotary evaporator and then subjected to cold isostatic pressing (CIP) at a pressure of 3000 kg/cm² to form a green body of 35 mm × 45 mm × 6 mm.

The resulting green body was sintered under the following conditions:

(1) Temperature conditions
 (a) Room temperature to 1200° C.: Heating at a temperature-rising rate of 20° C./minute;
 (b) 1200° C. to 1800° C.: Heating at a temperature-rising rate of 6° C./minute;
 (c) 1800° C.: Kept for 4 hours:
 (d) 1800° C. to 1200° C.: Cooled at a temperature-decreasing rate of 6° C./minute; and
 (e) 1200° C. to room temperature: Spontaneously cooled in a furnace.

(2) Atmosphere

Nitrogen gas was used. In the above step (c), the nitrogen gas pressure was set at 9.0 kg/cm².

After sintering, the resulting samples were subjected to a HIP treatment comprising heating at a temperature-rising rate of 600° C./hour from room temperature to 1800° C. at a nitrogen gas pressure of 200 kg/cm², keeping at 1800° C. for two hours, and then cooling in a furnace. This HIP treatment was conducted by embedding the sintered body in boron nitride powder. After that, samples were embedded in tungsten metal powder (Examples 1 and 5), in tungsten carbide powder (Examples 2-4) and in aluminum nitride powder (Comparative Examples 1-3), respectively, and heat-treated at the heating temperature and the heating time show in Table 1. In Comparative Examples 4 and 5, samples, which had been sintered in the same manner as in Example 1, were not heat-treated to obtain final samples.

The weight change of each sample was determined according to the following formula:

$$\text{Weight Change (\%)} = \frac{Wb - Wa}{Wa} \times 100$$

wherein Wa is a weight % of the sintered body before heat treatment and Wb is a eight of the sintered body after heat treatment.

Each sample was subjected to an X-ray diffraction test to evaluate the degree of crystallinity of the boundary phase. The following value ($I/I_0$) was calculated for each sample.

$$I/I_0 (\%) = \frac{\text{Peak Height Appearing at about 32°}}{\text{Maximum Peak Height of Diffraction of } \beta\text{-Si}_3\text{N}_4} \times 100$$

The weight change and $I/I_0$ are shown in Table 1.

Samples (3 mm × 4 mm × 40 mm) of the sintered bodies were subjected to a 3-point bending test according to JIS R 1601-1981 at 1300° C. to measure their strength. The results are also shown in Table 1.

TABLE 1

| No. | Powder | Temp. (°C.) | Time (hr.) | Weight Change (%) | $I/I_0$ (%) | Strength at 1300° C. (kg/mm²) |
|---|---|---|---|---|---|---|
| Example No. | | | | | | |
| 1 | Tungsten | 1750 | 5 | −11.9 | 5.2 | 64.2 |
| 2 | Tungsten Carbide | 1750 | 5 | −2.5 | 2.7 | 56.3 |
| 3 | Tungsten Carbide | 1750 | 2 | −0.6 | 2.7 | 55.8 |
| 4 | Tungsten Carbide | 1400 | 2 | −0.1 | 2.2 | 47.5 |
| 5 | Tungsten | 1750 | 10 | −14.4 | 2.6 | 65.1 |
| Comparative Example No. | | | | | | |
| 1 | Aluminum Nitride | 1750 | 5 | −1.7 | 0.8 | 32.4 |
| 2 | Aluminum Nitride | 1750 | 2 | −0.8 | 0.0 | 31.5 |
| 3 | Aluminum Nitride | 1400 | 2 | −0.1 | 0.0 | 30.6 |
| 4 | — | No Heat Treatment | | — | 0.0 | 29.2 |
| 5 | — | No Heat Treatment | | — | 0.0 | 30.5 |

It is clear from Table 1 that the silicon nitride sintered bodies subjected to the heat treatment in which the sintered bodies were embedded in tungsten powder or tungsten carbide powder have higher strength than those subjected to the heat treatment in which the sintered bodies were embedded in aluminum nitride powder. Samples subjected to no heat treatment after sintering (Comparative Examples 4 and 5) have lower strength.

The samples in Examples have the $I/I_0$ values exceeding 2%, while the $I/I_0$ values of the samples in Comparative Examples are lower than 2% or even zero (i.e., substantially anno peak existed at about 32° C.). Accordingly, it is clear that the grain boundary phases in the samples of Examples are more crystallized than those in Comparative Examples. It is presumed that in the grain boundary phases of the samples in Examples, crystals consisting mainly of $Y_5N(SiO_4)_3$ grow.

FIG. 1 shows the relationship between a weight change (weight loss) and a strength at 1300° C. with respect to the samples in Examples 1, 2 and Comparative Example 1. As is clear from FIG. 1, in the sintered body samples in Examples 1 and 2 in which the sintered bodies were subjected to the heat treatment according to the present invention, a greater weight loss is observed than that of Comparative Example 1 in which the sintered body was not subjected to the heat treatment according to the present invention. It is also clear that as the weight decreases, the resulting silicon nitride sintered body has higher strength.

EXAMPLES 6-9, COMPARATIVE EXAMPLES 6-9

The sintered bodies were produced in the same manner as in Example 1, by using the same silicon nitride powder as in Example 1 and the sintering aids shown in Table 2.

The resulting sintered bodies were subjected to the crystallization heat treatment by using tungsten powder at 1750° C. for 5 hours.

With respect to the samples thus obtained, the strength at 1300° C. was measured in the same manner as in Example 1. The results are shown in Table 2.

For Comparative Examples 6-9, silicon nitride sintered bodies were produced from the same powder compositions as in Examples 6-9, respectively, and they were not subjected to a crystallization heat treatment in tungsten powder. Each sample thus obtained as measured with respect to a strength at 1300° C. The results re also shown in Table 2.

TABLE 2

| No. | Al Compound (Weight %) | Compound of IIIa Element (Weight %) | Crystallization Heat Treatment | | | Strength at 1300° C. (kg/mm$^2$) |
|---|---|---|---|---|---|---|
| | | | Powder | Temp. (°C.) | Time (hr.) | |
| Example No. | | | | | | |
| 6 | Al$_2$O$_3$ (1%) | Yttrium Oxalate (2.5%) | Tungsten | 1750 | 5 | 65.4 |
| 7 | Al$_2$TiO$_5$ (1%) | Nd$_2$O$_3$ (2.5%) | Tungsten | 1750 | 5 | 62.3 |
| 8 | — | Yb$_2$O$_3$ (2.5%) | Tungsten | 1750 | 5 | 66.2 |
| 9 | 3Y$_2$O$_3$.5Al$_2$O$_3$ (3%) | | Tungsten | 1750 | 5 | 67.2 |
| Comparative Example No. | | | | | | |
| 6 | Al$_2$O$_3$ (1%) | Yttrium Oxalate (2.5%) | — | — | — | 31.8 |
| 7 | Al$_2$TiO$_5$ (1%) | Nd$_2$O$_3$ (2.5%) | — | — | — | 32.5 |
| 8 | — | Yb$_2$O$_3$ (2.5%) | — | — | — | 33.8 |
| 9 | 3Y$_2$O$_3$.5Al$_2$O$_3$ (3%) | | — | — | — | 32.9 |

As is clear from Table 2, the samples in Examples 6-9 have higher strength than the corresponding samples in Comparative Examples 6-9.

As described above in detail, in the method of the present invention, the silicon nitride sintered body is heat-treated under conditions such that it is embedded in the specified metal powder and/or the metal carbide powder, so that the high-temperature strength can be obtained in a remarkably shorter period of tim as compared with those produced by the heat treatment using aluminum nitride powder.

The heat-treated silicon nitride sintered bodies of the present invention are suitable for engineering ceramic members for turbine parts, etc. which are required to have excellent high-temperature strength.

What is claimed is:

1. A method for increasing the crystallinity of a silicon nitride sintered body which was produced from silicon nitride powder and a sintering aid powder, comprising:

(1) embedding said silicon nitride sintered body in a powder of at least one substance selected from the group consisting of W, Mo, Ta, Re, and carbides thereof; and
   (2) heat-treating said embedded silicon nitride sintered body in a non-oxidizing atmosphere at a temperature of 1400°-1950° C.

2. The method according to claim 1, wherein said sintering aid is a compound of a IIIa element or a mixture of an Al compound and said compound of a IIIa element.

3. The method according to claim 1, wherein said heat-treated temperature is 1700°-1800° C.

4. The method according to claim 1, wherein said heat-treated step is carried out for 2-10 hours.

5. The method according to claim 4, wherein said heat-treating step is carried out for 2-5 hours.

6. The method according to claim 1, wherein said non-oxidizing atmosphere consists essentially of nitrogen gas.

7. The method according to claim 7, wherein said powder consists essentially of tungsten powder.

8. The method according to claim 7, wherein said powder consists essentially of tungsten powder.

9. The method according to claim 1, wherein said powder has an average particle size of about 1-10 μm.

10. The method according to claim 2, wherein said group IIIa elements are selected from the group consisting of scandium, yttrium and lanthanide.

11. The method according to claim 10, wherein said compound of a IIIa element sintering aid is selected from the group consisting of Y$_2$O$_3$, yttrium oxalate, Nd$_2$O$_3$, and Yb$_2$O$_3$.

12. The method according to claim 11, wherein said sintering aid is a mixture of Y$_2$O$_3$ and Al$_2$O$_3$.

13. The method according to claim 12, wherein said Y$_2$O$_3$ comprises 2.5-5 weight % of said sintered body and said Al$_2$O$_3$ comprises 0.5-2 weight % of said sintered body.

14. A method for increasing the crystallinity of a silicon nitride sintered body which was produced from silicon nitride powder and a sintering aid powder, comprising:

(1) embedding said silicon nitride sintered body in a powder of at least one substance selected from the group consisting of W, Mo, Ta, Re, and carbides thereof; and
(2) heat-treating said embedded silicon nitride sintered body in a non-oxidizing atmosphere at a temperature of 1400°–1950° C., wherein said sintering aid powder is a compound of a IIIa element or a mixture of an Al compound and said compound of a IIIa element, said IIIa element being selected from the group consisting of scandium, yttrium, and lanthanide.

* * * * *